United States Patent
Blunn et al.

(10) Patent No.: US 10,221,491 B2
(45) Date of Patent: Mar. 5, 2019

(54) PROCESS AND APPARATUS FOR GENERATING OR RECOVERING HYDROCHLORIC ACID FROM METAL SALT SOLUTIONS

(71) Applicant: AUSTRALIAN BIOREFINING PTY LTD, Evans Head (AU)

(72) Inventors: Adam Justin Blunn, Woodburn (AU); Dirk Moore Treasure, Oxenford (AU)

(73) Assignee: AUSTRALIAN BIOREFINING PTY LTD, Evans Head (AU)

( * ) Notice: Subject to any disclaimer, the term of this patent is extended or adjusted under 35 U.S.C. 154(b) by 0 days.

(21) Appl. No.: 14/410,547

(22) PCT Filed: Jun. 26, 2013

(86) PCT No.: PCT/AU2013/000685
§ 371 (c)(1),
(2) Date: Dec. 22, 2014

(87) PCT Pub. No.: WO2014/000030
PCT Pub. Date: Jan. 3, 2014

(65) Prior Publication Data
US 2015/0345033 A1    Dec. 3, 2015

(30) Foreign Application Priority Data
Jun. 29, 2012 (AU) ................................ 2012902774

(51) Int. Cl.
*C01B 7/03* (2006.01)
*C25B 1/02* (2006.01)
(Continued)

(52) U.S. Cl.
CPC .............. *C25B 1/26* (2013.01); *B01D 5/0057* (2013.01); *C01B 7/03* (2013.01); *C01B 7/0737* (2013.01);
(Continued)

(58) Field of Classification Search
CPC .. C01B 7/012; C25B 1/00; C25B 1/10; C25B 1/20; C25B 1/26; C25B 1/46; C25B 9/08; C25D 3/20
See application file for complete search history.

(56) References Cited

U.S. PATENT DOCUMENTS

| | | | | |
|---|---|---|---|---|
| 2,681,319 A | * | 6/1954 | Bodamer | ............... C08J 5/2275 127/46.2 |
| 2,865,823 A | * | 12/1958 | Harris et al. | ............. B01J 47/12 204/238 |

(Continued)

FOREIGN PATENT DOCUMENTS

| | | | | |
|---|---|---|---|---|
| CN | 102134058 A | | 7/2011 | |
| GB | 1388292 A | * | 3/1975 | ............. C01B 7/012 |

(Continued)

OTHER PUBLICATIONS

S. Sachdeva, R.P. Ram, J.K. Sing, and A. Kumar. "Synthesis of Anion Exchange Polystyrene Membranes for the Electrolysis of Sodium Chloride." AIChE Journal. Feb. 11, 2008. vol. 54, Issue 4. pp. 940-949.*

*Primary Examiner* — Steven A. Friday
(74) *Attorney, Agent, or Firm* — Lando & Anastasi, LLP

(57) ABSTRACT

The present invention relates to an electrochemical process for generating or recovering hydrochloric acid from metal salt solutions such as acidic metal salt solutions and saline solutions. The process is useful for treating acidic salt solutions that are waste products from mineral processing or other industrial processes such as metal finishing, water softening, water treatment, reverse osmosis, electrodialysis, coal seam gas extraction, shale gas extraction and shale oil extraction, to generate high purity hydrochloric acid, metal salts and recycled water that may be re-used in the industrial process. An apparatus for performing the electrochemical process is also described.

19 Claims, 1 Drawing Sheet

(51) Int. Cl.
*C25B 1/26* (2006.01)
*C25B 15/08* (2006.01)
*B01D 5/00* (2006.01)
*C25B 9/10* (2006.01)
*C01B 7/07* (2006.01)
*C25B 1/46* (2006.01)

(52) U.S. Cl.
CPC ............ *C25B 1/02* (2013.01); *C25B 1/46* (2013.01); *C25B 9/10* (2013.01); *C25B 15/08* (2013.01); *Y02E 60/368* (2013.01)

(56) References Cited

U.S. PATENT DOCUMENTS

| | | | |
|---|---|---|---|
| 4,336,115 A | 6/1982 | Selby, III et al. | |
| 4,486,278 A * | 12/1984 | Oda | C25B 11/00 204/290.03 |
| 4,595,579 A * | 6/1986 | Prudhon et al. | B01J 19/121 204/157.41 |
| 7,351,391 B1 | 4/2008 | Olsen et al. | |
| 2003/0024824 A1 * | 2/2003 | Bulan | C25B 1/26 205/620 |
| 2004/0074780 A1 * | 4/2004 | Twardowski | C25B 1/24 205/618 |
| 2009/0145770 A1 * | 6/2009 | Sims | C25B 1/46 205/556 |
| 2011/0081561 A1 | 4/2011 | Keshavarz et al. | |
| 2011/0177550 A1 * | 7/2011 | McMurran | B01D 61/445 435/41 |
| 2012/0175267 A1 * | 7/2012 | Bhavaraju et al. | C25B 1/26 205/412 |

FOREIGN PATENT DOCUMENTS

| | | |
|---|---|---|
| JP | S52-16484 A | 2/1977 |
| JP | H06-272068 A | 9/1994 |
| JP | 2009256161 A | 11/2009 |
| JP | 2013528696 A | 7/2013 |
| WO | 2004041731 A1 | 5/2004 |
| WO | WO 2010083555 A1 * | 7/2010 ............... C25B 1/00 |
| WO | WO 2010138947 A2 * | 12/2010 ............ B01J 19/123 |

* cited by examiner

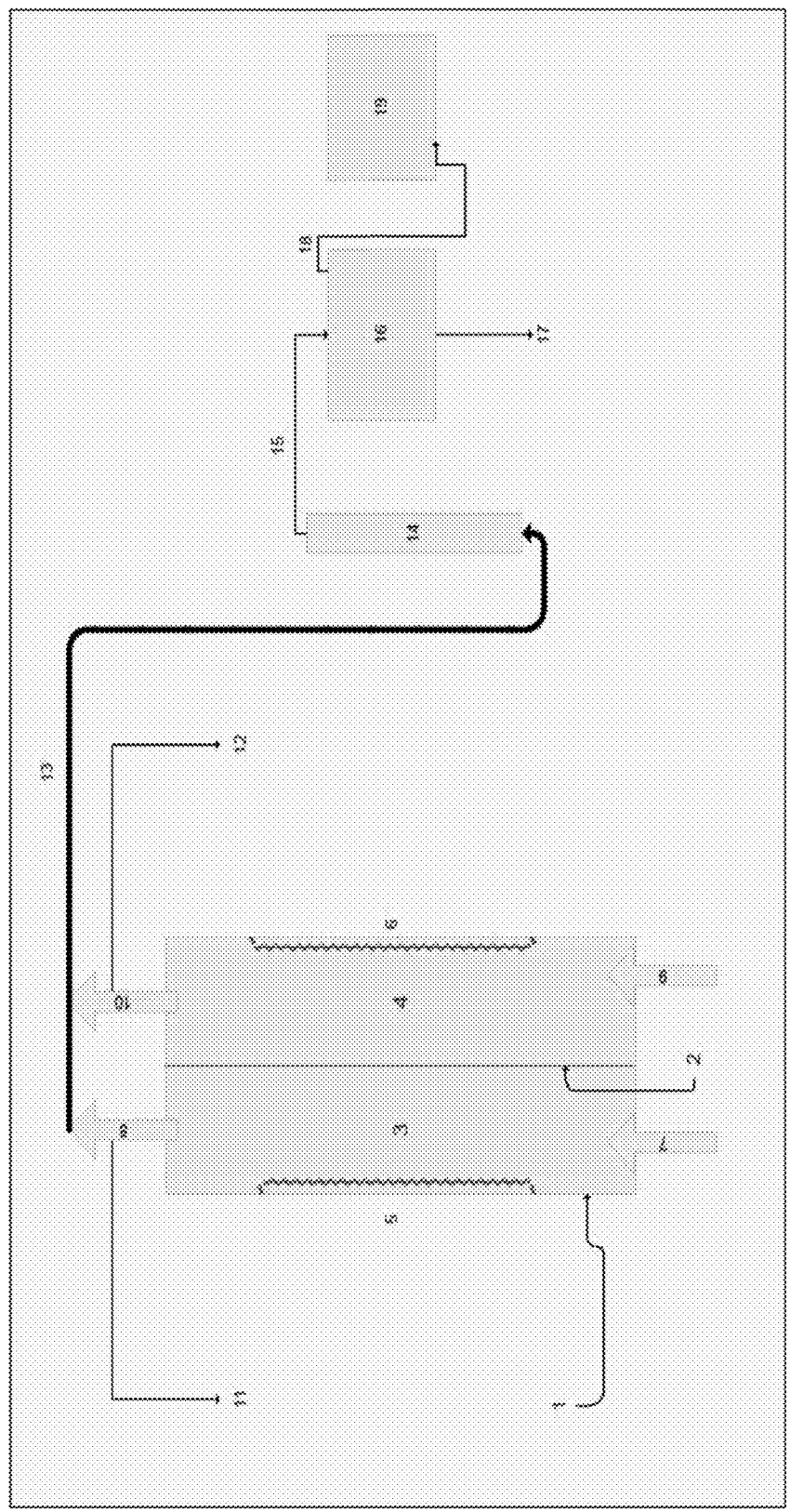

PROCESS AND APPARATUS FOR GENERATING OR RECOVERING HYDROCHLORIC ACID FROM METAL SALT SOLUTIONS

This application is a U.S. National Stage Application under 35 U.S.C. § 371 from International Application No. PCT/AU2013/000685, filed Jun. 26, 2013, which claims priority to Australian Patent Application No. 2012902774, filed Jun. 29, 2012, both of which are hereby incorporated by reference in their entirety for all purposes.

FIELD OF THE INVENTION

The present invention relates to an electrochemical process for generating or recovering hydrochloric acid from metal salt solutions such as acidic metal salt solutions and saline solutions. The process is useful for treating acidic salt solutions that are waste products from mineral processing or other industrial processes such as metal finishing, water softening, water treatment, reverse osmosis, electrodialysis, coal seam gas extraction, shale gas extraction and shale oil extraction, to generate high purity hydrochloric acid, metal salts and recycled water that may be re-used in the industrial process. An apparatus for performing the electrochemical process is also described.

BACKGROUND OF THE INVENTION

Solutions having low pH and/or high concentrations of metal chlorides are produced as waste products in mining and other industrial processes or are present in water or waste water requiring treatment or are formed in the environment and cause salinisation of an environment.

Typically mineral processing and other industrial processes produce waste solutions that are heavily loaded with a range of metal ions, are often highly saline and sometimes acidic. Most metal ions are soluble in aqueous solution at low pH and are therefore not readily precipitated to allow separation or removal from the solution. Such solutions have been considered waste products and the recovery of acid and/or removal of metal ions was not considered viable.

Several methods to produce hydrochloric acid (HCl) and a metal hydroxide from salt solutions have been developed. These processes often use electrolytic cells that have cation exchange membranes which are susceptible to metal ion fouling. Other processes require significant purification of the metal chloride containing solution or complex apparatus and often produce only low concentrations of HCl. These processes are not practical or efficacious enough to be a commercially viable means of remediating waste water or producing high quality concentrated HCl.

A known process for producing sulfuric acid electrolytically using an anion exchange membrane is known (WO2010/083555). However, this process is unsuccessful with chloride ions because the chloride ions react at the anode to produce chlorine rather than hydrogen ions to produce HCl. Although attempts to prevent chloride oxidation at the anode have been investigated, including use of additional membranes to prevent chloride transport to the anode (K. Scott, Electrical Processes for Clean Technology, Royal Society of Chemistry, 1995) and use of catalytic anodes aimed at preventing chloride oxidation (D. Pletcher and F. C. Walsh, Industrial Electrochemistry, $2^{nd}$ Edition, Springer, 1990), such solutions have not been efficacious in producing commercially economic HCl.

There is a need for a process that can be used to treat solutions containing high concentrations of metal chlorides and that may also be acidic, to produce high purity concentrated HCl, metal hydroxide precipitates and clean water, that is easy to use, has minimal membrane fouling, is insensitive to other non-metal chloride components that may be present in the solution and is efficacious at producing high purity HCl and reuseable water.

SUMMARY OF THE INVENTION

In a first aspect of the present invention, there is provided a process for recovering or generating hydrochloric acid from a solution comprising one or more metal chlorides, said process comprising:
1. supplying a feed solution comprising at least one metal chloride to an electrolytic cell comprising an anode chamber housing an anode and a cathode chamber housing a cathode, the anode chamber and cathode chamber separated by an anion exchange membrane; wherein the feed solution is supplied to the cathode chamber;
2. applying an electric current to the electrolytic cell sufficient to generate gaseous hydrogen and hydroxide ions at the cathode, wherein the metal chlorides dissociate to form metal ions and chloride ions, the metal ions reacting with the hydroxide ions to form metal hydroxides and the chloride ions passing through the anion exchange membrane; and wherein the chloride ions undergo oxidation at the anode in the anode chamber to form gaseous chlorine;
3. reacting the gaseous chlorine and gaseous hydrogen in the presence of a catalyst to form gaseous hydrogen chloride; and
4. condensing the gaseous hydrogen chloride in one or more condensing chambers.

In another aspect of the invention there is provided the use of the process of the invention in the treatment of an aqueous composition comprising metal chlorides.

In another aspect of the invention there is provided an apparatus for recovering or generating hydrochloric acid comprising:
1. an eletrolytic cell comprising:
   a. an anode chamber comprising an anode, an inlet and an outlet;
   b. a cathode chamber comprising a cathode, an inlet and an outlet;
   c. an anion exchange membrane separating the anode chamber and the cathode chamber;
2. a catalytic reactor for reacting gaseous hydrogen and gaseous chlorine; said reactor having an inlet connected to the outlet of the cathode chamber and the outlet of the anode chamber and an outlet connected to the at least one condensing chamber and said catalytic reactor comprising a source of catalyst; and
3. at least one condensing chamber for condensing gaseous hydrogen chloride, said condensing chamber comprising water.

BRIEF DESCRIPTION OF THE DRAWINGS

FIG. 1 is a diagram of an electrochemical apparatus of the invention comprising an anode (5) and a cathode (6), a catalytic reactor (14), a condensing trap (16) and a pump (19).

DETAILED DESCRIPTION OF THE INVENTION

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described.

The articles "a" and "an" are used herein to refer to one or to more than one (i.e. to at least one) of the grammatical object of the article. By way of example, "an element" means one element or more than one element.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

In a first aspect of the present invention, there is provided a process for recovering or generating hydrochloric acid from a solution comprising one or more metal chlorides, said process comprising:

1. supplying a feed solution comprising at least one metal chloride to an electrolytic cell comprising an anode chamber housing an anode and a cathode chamber housing a cathode, the anode chamber and cathode chamber separated by an anion exchange membrane; wherein the feed solution is supplied to the cathode chamber;
2. applying an electric current to the electrolytic cell sufficient to generate gaseous hydrogen and hydroxide ions at the cathode, wherein the metal chlorides dissociate to form metal ions and chloride ions, the metal ions reacting with the hydroxide ions to form metal hydroxides and the chloride ions passing through the anion exchange membrane; and wherein the chloride ions undergo oxidation at the anode in the anode chamber to form gaseous chlorine;
3. reacting the gaseous chlorine and gaseous hydrogen in the presence of a catalyst to form gaseous hydrogen chloride; and
4. condensing the gaseous hydrogen chloride in one or more condensing chambers.

In some embodiments, the feed solution comprises at least one metal chloride selected from sodium chloride, potassium chloride, magnesium chloride, manganese chloride, calcium chloride, ferric chloride, ferrous chloride, zinc chloride, nickel chloride, copper chloride, barium chloride, strontium chloride and aluminium chloride.

The amount of chlorides that are able to be present in the feed solution may be any amount. The maximum amount present of any particular chloride may be determined by its solubility in the feed solution. The feed solution may comprise as little as 100 ppm or less of one or more chlorides or may comprise one or more chlorides up to their saturation point or any amount in between. In some embodiments, the feed solution comprises a mixture of chlorides.

In some embodiments, the feed solution is acidic having a pH below 7. In some embodiments, the acid in the feed solution is HCl. However, other acids, for example, sulfuric acid or phosphoric acid may be present without affecting the process. Other acids collect in the anolyte or anion receiving stream and are removed with that stream or are bled from the anion receiving stream if required.

The current applied to the electrolytic cell will depend on the content of the feed solution. Typically the current applied will be between 100 and 5000 amps per square meter of electrode, especially between 200 and 2000 amps per square meter of electrode.

In some embodiments, the metal hydroxides formed at the cathode precipitate. In these embodiments, the metal hydroxides may be recoverable from the cathode chamber. In some embodiments, the metal hydroxides precipitate on the cathode and are recoverable by removing the cathode from the chamber and collecting the metal hydroxides from the cathode, for example, by gentle scraping or brushing.

In some embodiments the gaseous chlorine and gaseous hydrogen are collected from the electrolytic cell by application of negative pressure. The negative pressure draws the gases out of the electrolytic cell as they are generated and brings them into contact with the catalyst. In some embodiments, the negative pressure applied is between −1 and −30 kPa.

In some embodiments, the gaseous chlorine and the gaseous hydrogen are mixed as they are removed from the electrolytic cell. For example, the outlet from the cathode chamber and the outlet from the anode chamber combine to form a single pipeline or both enter the same pipeline and the gaseous hydrogen and gaseous chlorine mix in the pipeline. In other embodiments, the gaseous hydrogen and gaseous chlorine are mixed in a mixing chamber located between the electrolytic cell and a chamber in which the gaseous chlorine and gaseous hydrogen are reacted in the presence of a catalyst. In particular embodiments, the outlet from the cathode chamber and the outlet from the anode chamber combine to form a single pipeline or both enter the same pipeline and the gaseous hydrogen and gaseous chlorine mix in the pipeline. Without wishing to be bound by theory, the production of stoichiometric amounts of gaseous chlorine and gaseous hydrogen and the controlled mixing of the gaseous chlorine and gaseous hydrogen after they leave the electrolytic device results in small amounts of gases mixing at any one time and reduces or eliminates any risk of explosive reaction between the two gases.

In some embodiments, the reaction of the gaseous chlorine and gaseous hydrogen occurs in a catalytic reactor. In some embodiments, the mixture of gaseous chlorine and gaseous hydrogen is obtained directly from the electrolytic cell and the two gases are mixed in the pipeline between leaving the electrolytic cell and entering the catalytic reactor. In some embodiments, the mixture of gaseous chlorine and gaseous hydrogen is obtained from a mixing chamber located between the electrolytic cell and the catalytic reactor.

In some embodiments, the catalyst is a solid catalyst. In other embodiments, the catalyst is UV light. In embodiments where the catalyst is a solid catalyst, the catalyst is located in the catalytic chamber. In particular embodiments, the solid catalyst is activated carbon or a transition metal catalyst, especially activated carbon. In other embodiments, the catalyst is UV light, the source of UV light situated such that the UV light is focussed or dispersed into the catalytic reactor. In some embodiments, the catalyst is located between the inlet into the catalytic chamber and the outlet from the catalytic chamber. For example, UV light may be focussed in a specific region of the catalytic reactor or may be diffused throughout the catalytic reactor. Alternatively, a solid catalyst may be located on a solid support suspended in the chamber. For example, in one embodiment, activated carbon is supported in a flow tube and the gases flow through a heated column of activated carbon.

In some embodiments, the reaction between the gaseous chlorine and gaseous hydrogen occurs at a temperature of 150° C. and 400° C., especially 170° C. and 350° C., 170° C. and 300° C. or 170° C. and 250° C., more especially between 170° C. and 200° C. or 180° C. to 200° C. In some embodiments, the temperature is below 200° C.

In some embodiments, the gaseous hydrogen chloride formed in the catalytic reactor is removed from the reactor using negative pressure. The negative pressure draws the hydrogen chloride gas formed, out of the catalytic reactor and into the condensing chamber. In some embodiments where negative pressure is applied, the pressure is between −1 and −30 kPa.

In some embodiments, the gaseous hydrogen chloride is condensed in one or more condensing water traps. In some embodiments, the hydrogen chloride is condensed in a single water trap. In other embodiments, the hydrogen chloride is condensed in multiple water traps, for example, two, three or four, water traps, located in sequence. The gaseous hydrogen chloride is absorbed into the water of the water trap to produce hydrochloric acid. In some embodiments, the water trap is a chamber of water into which the gaseous hydrogen chloride enters and is dissolved or absorbed. In other embodiments, the water trap is a trickle-bed absorption column or a water spray absorption chamber. In embodiments where more than one condensing chamber is present, the condensing chambers may be the same or different.

In some embodiments, the condensed hydrochloric acid (HCl) produced by the process has a concentration in the range of 0.5M to 13M, especially 1M to 12.5M, 2M to 12.5M, 3M to 12.5M, 4M to 12.5M, 5M to 12.5M, 6 to 12.5M, 7 to 12.5M, 8M to 12.5M, 9M to 12.5M, 10M to 12.5M, 11M to 12.5M or 11.5M to 12.5M. In some embodiments, the HCl produced is concentrated HCl, especially high purity concentrated HCl. In particular, the concentrated HCl has a concentration of at least 20% (6.02M), especially at least 30% (9.45M), more especially between 32% and 40% (10.9M to 12.39M).

The purity of the HCl produced depends on the quality of the water in the condensing trap. Any impurities in the water will be incorporated into to the HCl produced. In some embodiments, the purity of the HCl produced is >90%, especially >91%, >92%, >93%, >94%, >95%, >96%, >97%, >98% or >99%. In some embodiments, the purity of the HCl produced is >99.5%.

The HCl produced by the process is harvested by removing the water from the water trap when the required concentration of HCl has been obtained.

In some embodiments, treated feed solution is harvested from the electrolytic cell via the outlet in the cathode chamber. In some embodiments, the treated feed solution is water having a quality suitable for use in the industrial process from which the feed solution was derived or may be suitable for application in agriculture, cleaning or other uses of non-potable water. The quality of the water refers to any impurities present and depends on the components in the feed solution. For example, if the feed solution only contains metal chlorides, the water quality of the treated feed solution will be high and the total dissolved solids (TDS) will be low. However, if significant non-chloride components are present, water quality will be lower as the non-chloride components may remain in the treated feed solution. Some typical impurities include Na, K, Ca, Sr and Ba. In some embodiments, the water quality is such that the TDS is below 1000 ppm, especially below 500 ppm and in some embodiments, below 100 ppm.

In some embodiments, the anion receiving stream is dilute HCl, typically 10% HCl or lower. In some embodiments, the anion receiving stream is cycled more than once through the anode chamber of the electrolytic cell. If the feed solution contains anions other than chlorides and/or acids other than HCl, the anion receiving stream may become contaminated and at least a portion may need to be bled from the chamber and replaced with water.

In another aspect of the invention there is provided the use of the process of the invention in the treatment of an aqueous composition comprising metal chlorides.

In some embodiments, the aqueous composition comprising metal chlorides is a waste product from an industrial process, for example, mineral processing, metal extraction, metal finishing, metal etching, coal seam gas extraction, shale gas extraction, shale oil extraction, reverse osmosis or electrodialysis. In some embodiments, the aqueous composition is an environmental hazard, for example, by virtue of its acidic nature or because of the presence of toxic metal chlorides. In some embodiments, the aqueous composition requires softening.

In some embodiments, the aqueous composition is a spent pickle liquor, for example from metal processing such as in steel mills or from galvanization processes.

In other embodiments, the aqueous composition is a brine solution produced during coal seam gas production or shale gas production which may otherwise require storage in brine ponds.

In yet other embodiments, the aqueous composition is an environmental composition, for example, from an area where salinization has become an environmental hazard. In yet further embodiments, the chloride-containing feed solution is saline or brine, for example, sea water.

In another aspect of the invention there is provided an apparatus for recovering or generating hydrochloric acid comprising:
1. an eletrolytic cell comprising:
   a. an anode chamber comprising an anode, an inlet and an outlet;
   b. a cathode chamber comprising a cathode, an inlet and an outlet;
   c. an anion exchange membrane separating the anode chamber and the cathode chamber;
2. a catalytic reactor for reacting gaseous hydrogen and gaseous chlorine; said reactor having an inlet connected to the outlet of the cathode chamber and the outlet of the anode chamber and an outlet connected to the at least one condensing chamber and said catalytic reactor comprising a source of catalyst; and
3. at least one condensing chamber for condensing gaseous hydrogen chloride, said condensing chamber comprising water.

The anode is preferably a dimensionally stable valve metal electrode, such as a titanium electrode. The design of such dimensionally stable metal electrodes, especially titanium electrodes, is well known in the art of electrolysis, for example as described by Industrial Electrochemistry, D. Pletcher and F. C. Walsh, $2^{nd}$ Edition, Springer, 1990. A further example is described in Canadian Patent Application No. 915629.

The cathode is preferably in the form of an expanded metal or sheet metal or metal gauze electrode. In some embodiments, the cathode is a titanium or stainless steel electrode. In particular embodiments, the cathode is connected to the electrical source through a removable electrical terminal so that the cathode may be removed from the cathode chamber and the metal hydroxide formed during the process removed from the cathode, for example, by gentle scraping or brushing.

In some embodiments, the outlet from the anode chamber and the outlet from the cathode chamber combine into a single pipeline or both enter the same pipeline to allow mixing of the gaseous hydrogen and gaseous chlorine as they leave the electolytic cell and before they enter the catalytic reactor.

In some embodiments, the apparatus further comprises a mixing chamber located between the electrolytic cell and the catalytic reactor, the mixing chamber having an inlet connected to the cathode chamber to allow entry of the gaseous hydrogen and an inlet connected to the anode chamber to allow entry of the gaseous chlorine. The gaseous chlorine and gaseous hydrogen being mixed in the mixing chamber. The mixing chamber further comprising an outlet connected to the inlet of the catalytic reactor.

The catalyst is located in the catalytic reactor between the inlet and the outlet of the catalytic reactor. In some embodiments, the catalyst is UV light. In these embodiments, the catalytic reactor comprises a UV light source. In some embodiments, the catalyst is a solid catalyst such as activated carbon. In these embodiments, the catalyst may be dispersed on a support located in the chamber.

The one or more condensing chamber is connected either directly or indirectly to the outlet of the catalytic reactor. In some embodiments, the apparatus comprises one condensing chamber. In other embodiments, the apparatus comprises more than one condensing chamber, wherein the condensing chambers are located in sequence. Each condensing chamber having an outlet for collecting the HCl. The condensing chambers comprise water such that as the gaseous hydrogen chloride is condensed, it is dissolved in the water of the condensing chamber to form hydrochloric acid.

In some embodiments, the gases produced in the apparatus are moved through the apparatus by the application of negative pressure. In these embodiments, the apparatus further comprises a pump.

Advantageously, the apparatus of the invention may be used on any scale. In some embodiments, the apparatus is located near a brine source or at an industrial site and is of a size suitable to manage the waste streams produced and/or produce the quantity of HCl required. Alternatively, the apparatus may be used on a small scale to produce concentrated HCl at a time and place where it is needed to avoid the need for transporting the HCl. In some cases, the apparatus may be of a scale that is mobile and readily moved from one location to another.

An exemplary apparatus of the invention is shown in FIG. 1. The electrochemical flow cell (1) is divided by an anion exchange membrane (2) into an anode chamber (3) and a cathode chamber (4). The anode chamber (3) contains a dimensionally stable valve metal electrode (5), for example, a titanium electrode, which is connected to the positive pole of a direct current source.

The cathode chamber (4) comprises a cathode (6) which is connected through a removable electrical terminal to the negative pole of a direct current voltage source. The cathode is in the form of an expanded metal, sheet metal or metal gauze electrode, for example, a titanium or stainless steel electrode.

The anode chamber (3) has an inlet (7) for the entry of the anion receiving stream and an outlet (8) for the exit of the anion enriched stream and chlorine gas. The cathode chamber has an inlet (9) for the entry of the metal chloride containing feed solution that is to be treated by the electrolytic process and an outlet (10) for the exit of the metal chloride depleted stream and the hydrogen gas generated at the cathode.

The passage of electric current from a voltage source causes the generation of hydrogen gas at the cathode and creates a localized polarized region at the cathode surface. Due to this electropolarization, the metal cation species combines with hydroxide ions also generated at the cathode and may precipitate as a metal hydroxide. The precipitation of the metal hydroxide depends on the solubility of the metal hydroxide and the pH at which the process is performed.

The formation of the metal hydroxide species at the cathode also results in the liberation of chloride ions. The chloride ions migrate from the cathode chamber (4) through the anion exchange membrane (2) to the anode chamber (3). In the anode chamber (3), the chloride ions are oxidized at the anode (5) to form chlorine gas. The gaseous chlorine exits the electrolytic cell (1) through the anode chamber outlet (8).

The anion rich solution and chlorine gas generated exits the anode chamber (3) through the outlet (8) and is separated into liquid and gas, where the anion rich solution passes out of the apparatus through outlet (11) and the gaseous chlorine passes into the pipeline (13).

The metal chloride depleted solution and the hydrogen gas generated exits the cathode chamber (4) through outlet (10) and is separated into liquid and gas, where the metal chloride depleted solution passes out of the apparatus through outlet (12) and the gaseous hydrogen passes into the pipeline (13) where it mixes with the gaseous chlorine entering pipeline (13) through outlet (8).

Pipeline (13) carries the mixed gaseous hydrogen and gaseous chlorine to the catalytic reactor (14) where the catalytic combination of hydrogen and chloride occurs to form gaseous hydrogen chloride.

The gaseous hydrogen chloride exits the catalytic reactor (14) through outlet (15) where it is carried to at least one condensing chamber (16). The gaseous hydrogen chloride is condensed in the water of the condensing chamber (16) to form hydrochloric acid. Excess gaseous hydrogen chloride that is not condensed in a first condensing chamber (16) may be condensed in a further condensing chamber if required.

When sufficient hydrogen chloride has condensed in the water of the condensing chamber (16) to provide the desired concentration of HCl, the HCl is removed from the condensing chamber (16) through outlet (17).

Negative pressure may be applied throughout the apparatus by a pump (19) such as a suction pump.

The following examples are provided to illustrate the process in operation.

EXAMPLES

Example 1

550 mL of feed solution containing 142 g/L Fe as chloride, 271 g/L chloride and having a pH of less than 0 was fed into the cathode chamber of an apparatus of the invention. The solution was electrolyzed for 32 hours at 5 amps. 148 g of hydrochloric acid as recovered from the condensing chamber. The metal chloride depleted solution collected from the cathode chamber contained less than 0.7 g/L iron, 0.55 g/L chloride and had a pH of 4.3. The metal precipitate adhered to the cathode was recovered by removing the cathode and gently scraping or brushing the precipitate from the cathode.

Example 2

1 liter of feed solution containing 142 g/L iron as chlorides, 94.3 g/L free hydrochloric acid, was fed into the cathode chamber of an apparatus of the invention. The solution was electrolyzed for 54 hours at 6 amps. More than 99% of the chloride present in the feed solution was recovered as clean hydrochloric acid at a concentration of approximately 100 g/L. The treated feed solution recovered from the cathode after the process was complete contained less than 0.3 g/L iron and 0.42 g/L chloride. The metal hydroxides were recovered from the cathode as adherent precipitate by gentle scraping or brushing.

Example 3

1 liter of solution containing 50.7 g/l chloride, 2.7 g/l calcium, 716 ppm magnesium, 1330 ppm strontium, 1225 ppm barium, and 37.99 g/l free hydrochloric acid, was fed into the cathode compartment of an electrolytic flow cell and electrolyzed for 6.25 hours at 6 amps. The treated solution contained 4.08 g/l chloride, 1 ppm magnesium, 1.94 g/l calcium, and all original strontium and barium. 38.01 g of hydrochloric acid was recovered as pure hydrochloric acid, magnesium and calcium were recovered as hydroxides. The total power consumption was 112 watt hours, and the pH of the final treated solution was >10.

Example 4

1 liter of solution containing 584 ppm Na, 1050 ppm K, and 2415 ppm Cl was fed into the cathode compartment and electrolyzed for 13.5 hours at 1 amp. 99% of the chloride was recovered as 2.393 g hydrochloric acid, 1.08 g of caustic soda was produced, and the feed brine TDS was reduced from 4326 ppm to 115 ppm. The total power consumption for this was 43 watt hours.

While the foregoing has been given by way of illustrative example of this invention, all such and other modifications and variations thereto as would be apparent to a person skilled in the art are deemed to fall within the broad scope and ambit of this invention as it is herein set forth.

The invention claimed is:

1. A process for recovering or generating hydrochloric acid from a solution comprising one or more metal chlorides, said process comprising:
supplying a feed solution comprising at least one metal chloride to an electrolytic cell comprising an anode chamber housing an anode and a cathode chamber housing a cathode, the anode chamber and cathode chamber separated by an anion exchange membrane, wherein the feed solution is supplied to the cathode chamber;
applying an electric current to the electrolytic cell sufficient to generate gaseous hydrogen and hydroxide ions at the cathode, wherein the metal chlorides dissociate to form metal ions and chloride ions, the metal ions reacting with the hydroxide ions to form metal hydroxides and the chloride ions passing through the anion exchange membrane, wherein the chloride ions undergo oxidation at the anode in the anode chamber to form gaseous chlorine, and wherein the gaseous chlorine and gaseous hydrogen are removed from the electrolytic cell and combined in a single pipeline by application of negative pressure;
reacting the gaseous chlorine and gaseous hydrogen under negative pressure in the presence of an activated carbon catalyst to form gaseous hydrogen chloride; and
condensing the gaseous hydrogen chloride in one or more condensing chambers, wherein the one or more condensing chambers comprise water.

2. The process of claim 1, wherein the feed solution comprises at least one of sodium chloride, potassium chloride, magnesium chloride, manganese chloride, calcium chloride, ferric chloride, ferrous chloride, zinc chloride, nickel chloride, copper chloride, strontium chloride, barium chloride and aluminium chloride.

3. The process of claim 1, wherein the feed solution further comprises hydrochloric acid.

4. The process of claim 1, wherein the metal hydroxides precipitate and are collected on the cathode.

5. The process of claim 1, wherein the gaseous chlorine and gaseous hydrogen are mixed in a mixing chamber after collection and removal from the electrolytic cell.

6. The process of claim 1, wherein the reaction of the gaseous chlorine and gaseous hydrogen occurs at a temperature of 170° C. to 200° C.

7. The process of claim 1, wherein the hydrochloric acid produced is concentrated hydrochloric acid having a concentration greater than 20%.

8. The process of claim 1, wherein the feed solution is an aqueous composition comprising metal chlorides.

9. The process of claim 8, wherein the aqueous composition comprises at least one of sodium chloride, potassium chloride, magnesium chloride, manganese chloride, calcium chloride, ferric chloride, ferrous chloride, zinc chloride, nickel chloride, copper chloride, barium chloride, strontium chloride and aluminium chloride.

10. The process of claim 8, wherein the aqueous composition is derived from an industrial process.

11. The process of claim 10, wherein the industrial process is one of a metal finishing process, a metal etching process, a metal extraction process, a mineral processing process, a coal seam gas extraction process, a shale gas extraction process, or a shale oil extraction process.

12. The process of claim 8, wherein the aqueous composition is an environmental hazard, selected from acidic compositions and compositions comprising toxic metal chlorides.

13. The process of claim 8, wherein the aqueous composition is a spent pickle liquor.

14. The process of claim 8, wherein the aqueous composition is a brine solution waste product from one of coal seam gas extraction or shale gas extraction.

15. The process of claim 8, wherein the aqueous composition is sea water.

16. An apparatus for recovering or generating hydrochloric acid comprising:
an electrolytic cell comprising:
an anode chamber comprising an anode, an inlet and an outlet;
a cathode chamber comprising a cathode, an inlet and an outlet, wherein the inlet is for supply of a feed solution comprising at least one metal chloride to the cathode chamber; and an anion exchange membrane separating the anode chamber and the cathode chamber;

a catalytic reactor including a catalyst wherein the catalyst is activated carbon for reacting gaseous hydrogen and gaseous chlorine, said reactor having an inlet connected to the outlet of the cathode chamber and the outlet of the anode chamber and an outlet connected to at least one condensing chamber, wherein the outlet from the anode and the outlet from the cathode combine into a single pipeline to allow mixing of gaseous hydrogen and gaseous chlorine as they leave the electrolytic cell and before they enter the catalytic reactor;

the at least one condensing chamber for condensing gaseous hydrogen chloride, said condensing chamber comprising water; and a suction pump in fluid communication downstream of the catalytic reactor and the at least one condensing chamber and configured and arranged to apply negative pressure throughout the apparatus and to cause gaseous hydrogen and gaseous chlorine to be drawn out of the electrolytic cell and brought into contact with the catalyst under negative pressure where the hydrogen and chlorine react.

17. The apparatus of claim 16, wherein the activated carbon catalyst is located in the catalytic reactor between the inlet and the outlet of the catalytic reactor.

18. The apparatus of claim 16, having a single condensing chamber.

19. The apparatus of claim 16, comprising more than one condensing chamber located sequentially.

* * * * *